United States Patent [19]

Wataya et al.

[11] Patent Number: 5,828,387

[45] Date of Patent: Oct. 27, 1998

[54] RECORDING APPARATUS WITH COMPENSATION FOR VARIATIONS IN FEEDING SPEED

[75] Inventors: Masafumi Wataya, Kawasaki; Toshiyuki Yanaka, Tokyo; Hidejiro Kadowaki, Yokohama; Ken Tsuchii, Tokyo; Haruhiko Takahashi, Yokohama; Makoto Takamiya, Kawasaki; Kosuke Yamamoto, Yokohama, all of Japan

[73] Assignee: Canon Kabushiki Kaisha, Tokyo, Japan

[21] Appl. No.: 354,056

[22] Filed: Dec. 6, 1994

Related U.S. Application Data

[63] Continuation of Ser. No. 972,088, Nov. 5, 1992, abandoned, which is a continuation of Ser. No. 700,303, May 8, 1991, abandoned, which is a continuation of Ser. No. 407,063, Sep. 14, 1989, abandoned.

[30] Foreign Application Priority Data

Sep. 17, 1988 [JP] Japan .................................. 63-231469
Nov. 28, 1988 [JP] Japan .................................. 63-298299
May 31, 1989 [JP] Japan .................................... 1-136135

[51] Int. Cl.$^6$ ........................................................ B41J 2/05
[52] U.S. Cl. ................................ 347/14; 347/16; 347/42
[58] Field of Search ............................ 347/4, 14, 16, 347/42, 43, 116; 118/674

[56] References Cited

U.S. PATENT DOCUMENTS

| 3,564,120 | 2/1971 | Taylor | 347/43 X |
|---|---|---|---|
| 3,588,906 | 6/1971 | Van Brimer | 347/14 |
| 3,803,628 | 4/1974 | Van Brimer | 347/14 X |
| 3,987,492 | 10/1976 | Kraus | 347/43 X |
| 4,083,053 | 4/1978 | Ouchi | 347/4 |
| 4,096,487 | 6/1978 | Shafer | 346/136 X |
| 4,312,007 | 1/1982 | Winfield | 347/14 X |
| 4,339,762 | 7/1982 | Shirato et al. | 347/62 X |
| 4,393,386 | 7/1983 | DiGiulio | 347/4 |
| 4,401,024 | 8/1983 | Frentress | 347/116 X |
| 4,445,128 | 4/1984 | Dolan et al. | 346/160 |
| 4,467,348 | 8/1984 | Fujii et al. | 347/3 X |
| 4,558,356 | 12/1985 | Toda et al. | 358/75 |
| 4,562,445 | 12/1985 | Rich | 347/9 |
| 4,574,291 | 3/1986 | Wimmer | 347/108 |
| 4,595,931 | 6/1986 | Toganoh | 347/101 |
| 4,605,938 | 8/1986 | Matsuno | 346/136 X |
| 4,670,761 | 6/1987 | Yoshino | 347/14 X |
| 4,692,778 | 9/1987 | Yoshimura | 347/108 |
| 4,734,788 | 3/1988 | Emmett et al. | 358/300 |
| 4,737,860 | 4/1988 | Ono | . |
| 4,740,801 | 4/1988 | Shimazaki | 347/66 |
| 4,769,650 | 9/1988 | Fu | 347/4 X |
| 4,792,817 | 12/1988 | Barney | 347/4 |
| 4,860,034 | 8/1989 | Watanabe | 347/14 |

FOREIGN PATENT DOCUMENTS

0159703 10/1985 European Pat. Off. .
59-028762 2/1984 Japan .
59-101966 6/1984 Japan .

OTHER PUBLICATIONS

"Technik der magnetischen Videosignalaufzeichnung", Von Prof. Dr.–Ing. B. Morgenstern, B.G. Teubner, Stuttgart 1985, Cover, fwd, pp. 48–57, 114–121, and Extract Translation thereof.

Primary Examiner—Joseph W. Hartary
Attorney, Agent, or Firm—Fitzpatrick, Cella, Harper & Scinto

[57] ABSTRACT

A recording apparatus employs a control unit to compensate for any variations in the feed speed of a recording medium. The recording apparatus includes a recording unit for recording an image on a recording medium in accordance with the image data; a speed detection unit for detecting the actual feed speed of the recording medium or of a feed unit for feeding the recording medium; and a control unit for controlling the record timing of the recording unit in accordance with a difference between a reference feed speed and the actual feed speed of the recording medium or feed unit detected by the speed detection unit.

8 Claims, 9 Drawing Sheets

RECORDING APPARATUS WITH COMPENSATION FOR VARIATIONS IN FEEDING SPEED

This application is a continuation of application Ser. No. 07/972,088 filed Nov. 5, 1992, now abandoned, which was a continuation of application Ser. No. 07/700,303 filed May 8, 1991, now abandoned, which was a continuation of application Ser. No. 07/407,063 filed Sep. 14, 1989, now abandoned.

BACKGROUND OF THE INVENTION

1. Field of the Invention

The present invention relates to a recording apparatus for recording information such as images, characters or the like on a recording medium, and more particularly to a recording apparatus for recording information by producing relative motion between a recording medium and a recording head.

2. Related Background Art

There have been known heretofore serial type recording apparatuses and full-line type recording apparatuses such as the liquid jet (or discharge) recording apparatus which record information such as characters, images or the like on a recording medium by jetting out (or discharging) recording liquid from a recording head.

The former serial type recording apparatus is of the type that while a carriage is moved along a platen holding a recording medium, information is recorded by means of a recording head mounted on the carriage, and the recording medium or sheet is fed in the direction perpendicular to the direction of carriage movement. The latter full-line type recording apparatus is of the type that a recording head which has, e.g., ink ejection outlets disposed in the main scan direction over the recording width is moved in the sub-scan direction relative to a recording medium to record information.

For such serial type and full-line type recording apparatuses, there has also been proposed apparatus capable of not only monochrome recording but also color recording by using a plurality of recording heads.

Figure 12:
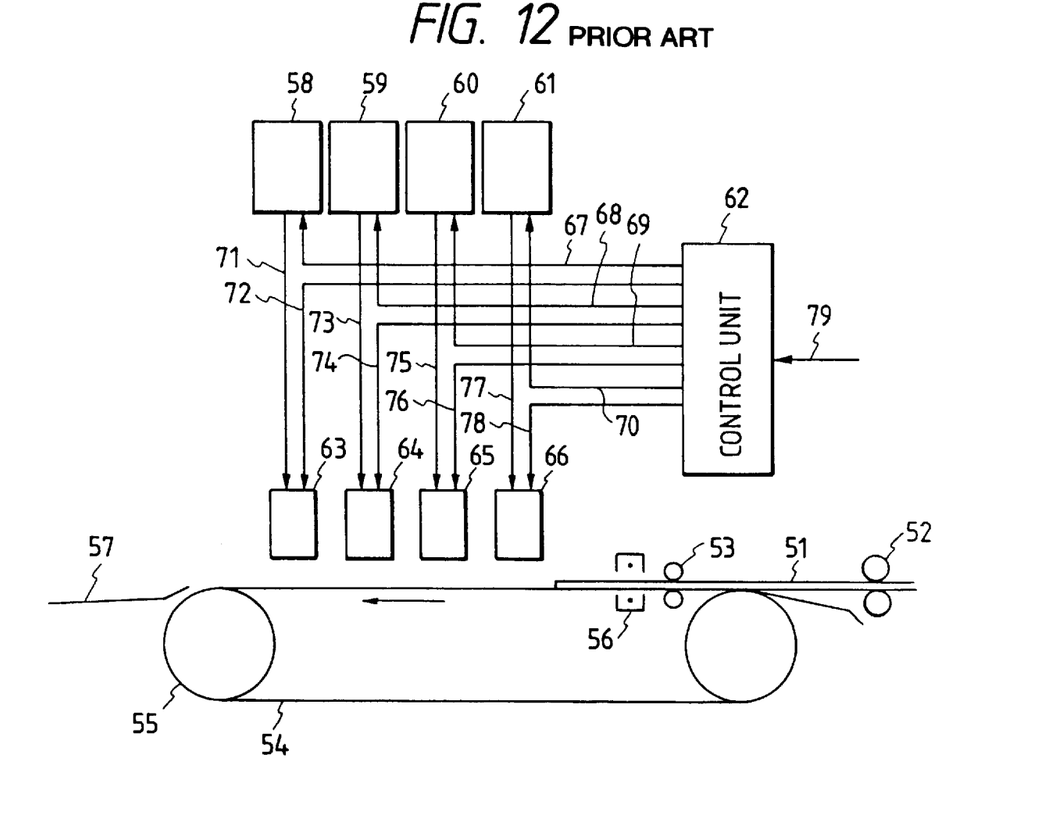
FIG. 12 is a schematic diagram illustrating a feed control mechanism of a conventional recording apparatus using a cut sheet.

FIG. 12 is a schematic diagram used for explaining a feed control mechanism of the above-described conventional recording apparatus. A cut sheet 51 as a recording medium is fed in the direction indicated by an arrow in synchro with the sub-scan record timing controlled by a registration roller.

A paper press roller 53 restricts the cut sheet 51 on a feed belt 54 from being displaced. The feed belt 54 is wound about drive rollers 55 with a constant tension. A charger 56 electrostatically attracts the cut sheet 51 toward the feed belt 54.

The cut sheet 51 with information recorded thereon is discharged and stacked upon a paper discharge tray 57. Image buffers 58 to 61 store yellow, magenta, cyan and black color data for reproducing a color image in response to record control signals from a control unit 62. Color images stored in the image buffers 58 to 61 are supplied from a reader unit or external apparatus such as computer or word processor (not shown). Under control of the control unit 62, color data are read from the respective image buffers 58 to 61 at predetermined timings after driving the registration roller 52, and outputted to recording heads 63 to 66 to thereby record each color image on the cut sheet 51. The recording heads 63 to 66 each are a line head for one or plural line recording. Memory control lines 67 to 70 are used for transferring record control signals from the control unit 62 to the image buffers 58 to 61. Data lines 71, 73, 75 and 77 are used for transferring color data read from the image buffers 58 to 61 to the recording heads 63 to 66. Record control lines 72, 74, 76 and 78 are used for transferring record timing signals from the control unit 62 to the recording heads 63 to 66. A start signal 79 is supplied from a main unit (not shown).

The record operation of the recording apparatus having a plurality of recording heads 63 to 66 as constructed above will be described.

When a cut sheet 51 is fed in the sub-scan direction in synchro with an image record timing controlled by the registration roller 52, the cut sheet 51 is attracted toward the feed belt 54 by means of the charger 56. At the same time, upon reception of the start signal 79, the control unit 62 outputs a record operation start command. Then, image data (color data) are read from the image buffer 61 at the timing synchronous with the top position of the cut sheet 51, and supplied to the first recording head 66 to thereby start recording information on the cut sheet 51.

Similarly, image data are read from the image buffers 60 to 58 at the timing s synchronous with proper distances from the pre ceding heads, and supplied to the second to fourth recording heads 65 to 63 to thereby record information on the cut sheet 51. As a result, a full-color image is recorded on the cut sheet 51 which is then discharged onto t he discharge paper tray 57.

Figure 13:
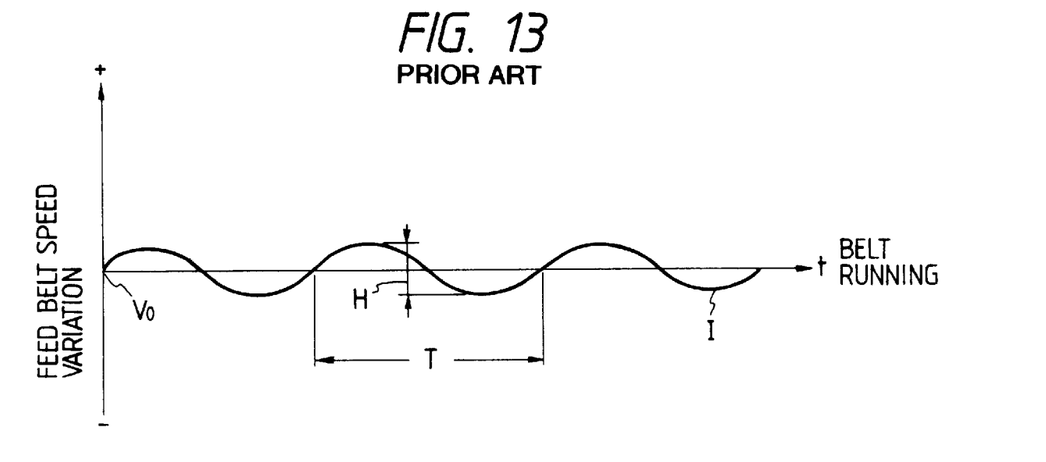
FIG. 13 is a graph showing the speed variation of the feed belt shown in FIG. 12.

The thickness of the feed belt 54 for transporting the cut sheet 51 or recording medium is not the same over the whole length and the drive roller 55 is not completely round, respectively because of manufacturing tolerances. The feed speed of the cut sheet 51 therefore has a cyclical variation as shown in FIG. 13 which illustrates the speed variation characteristic of the feed belt, the ordinate representing a belt speed and the abscissa representing time. I represents a speed curve, T a period of one revolution of the feed belt, and H a maximum speed variation.

As understood from FIG. 13, due to the thickness variation of the feed belt and the out-of-roundness of the drive roller 55, the speed of the feed belt 54 shifts to a plus side (acceleration) and minus side (deceleration) from a normal reference feed speed V0 during one cycle. As a result, the time required for the cut sheet 51 to reach the recording heads 66 to 63 from the registration roller 52 fluctuates so that the record timings of the recording heads 66 to 63 shift slightly and position registration cannot be ensured. Particularly in the case of a color image, even if a slight color shift occurs, a color bleeding generates, thus posing a significant problem of considerably lowering the image quality.

Figure 14:
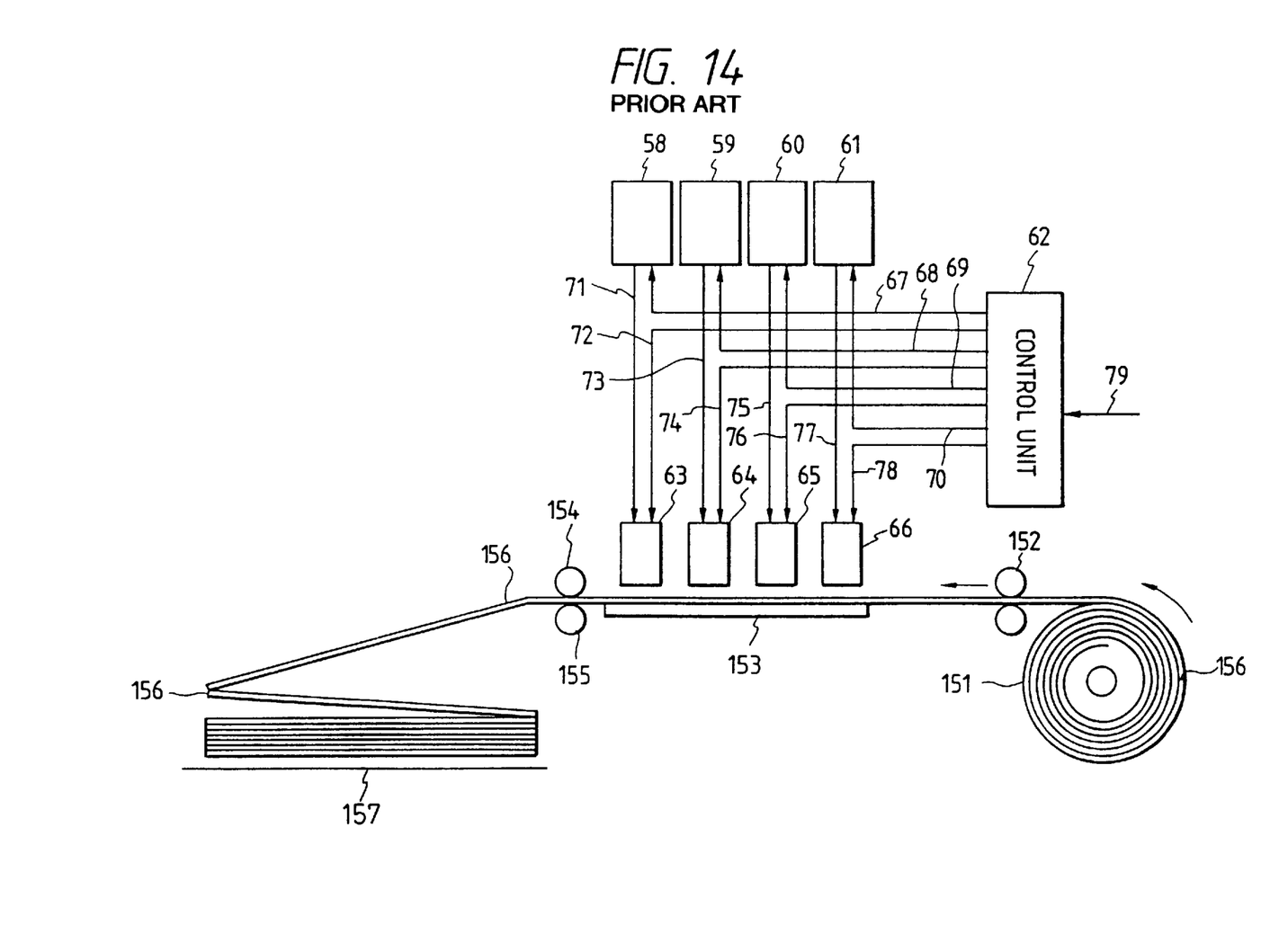
FIG. 14 is a schematic diagram illustrating a feed control mechanism of a conventional recording apparatus using a roll sheet.

FIG. 14 is a schematic diagram showing another example of a conventional recording apparatus. In FIG. 14, similar elements to those shown in FIG. 12 are represented by using identical reference numerals. A roll sheet 151 serving as a recording medium has perforations 156 at a predetermined pitch, and is fed in the direction indicated by an arrow by means of a paper feed roller 152. A flat plate 153 is used to stably transport the roll sheet 151 while being fed by feed rollers 154 and 155. The roll sheet 151 fed by the feed rollers 154 and 155 is folded and stacked upon a paper discharge tray 157.

Image buffers 58 to 61 store yellow, magenta, cyan and black color data for reproducing a color image in response to record control signals from a control unit 62. Under control of the control unit 62, color data are read from the respective image buffers 58 to 61 at predetermined timings after driving the feed rollers 154 and 155, and outputted to recording heads 63 to 66 to thereby record each color image on the roll sheet 151. Memory control lines 67 to 70 are used for transferring record control signals from the control unit 62 to the image buffers 58 to 61. Data lines 71, 73, 75 and 77 are used for transferring color data read from the image buffers 58 to 61 to the recording heads 63 to 66. Record control lines 72, 74, 76 and 78 are used for transferring record timing signals from the control unit 62 to the recording heads 63 to 66. A start signal 79 is supplied from a main unit (not shown).

The record operation of the recording apparatus having a plurality of recording heads 63 to 66 as constructed above will be described.

A roll sheet 151 is fed by means of the feed rollers 154 and 155. At the same time, upon reception of the start signal 79, the control unit 62 outputs a record operation start command. Then, image data (color data) are read from the image buffer 61 at the timing when a perforation 156 passes, and supplied to the first recording head 66 to thereby start recording information on the roll sheet 151.

Similarly, image data are read from the image buffers 60 to 58 at the timings synchronous with proper distances from the preceding heads, and supplied to the second to fourth recording heads 65 to 63 to thereby record information on the roll sheet 151. As a result, a full-color image is recorded on the roll sheet 151 which is then discharged onto the discharge paper tray 157.

Similar to the case of feeding a cut sheet as described previously, the feed speed varies due to the out-of-roundness of the feed rollers 154 and 155 which feed the roll sheet 151, and due to the load fluctuation on the roll sheet feeding mechanism.

Figure 15:
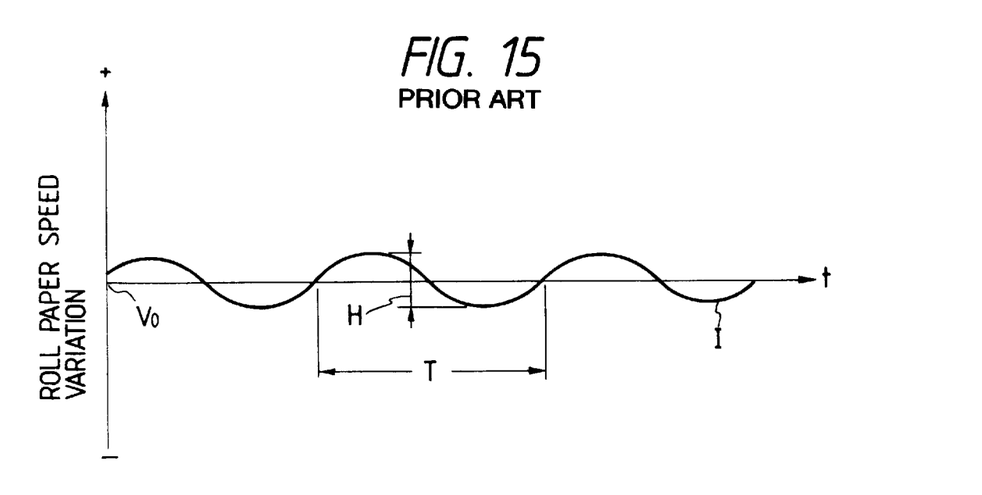
FIG. 15 is a graph showing the feed speed variation of a roll sheet shown in FIG. 14.

FIG. 15 illustrates the speed variation characteristic of the roll sheet 151 shown in FIG. 14, wherein the ordinate represents a roll sheet feed speed, and the abscissa represents the feed amount. In FIG. 15, I represents a speed curve, T a period of one revolution of the feed belt, and H a maximum speed variation. The period T is dependent upon the circularity of the feed rollers 154 and 155.

As understood from FIG. 15, due to the out-of-roundness of the feed rollers 154 and 155, the roll sheet feed speed shifts to a plus side (acceleration) and minus side (deceleration) from a normal reference feed speed V0 during one period T. As a result, the time required for the roll sheet 151 to reach the recording heads 66 to 63 after it was fed by the feed rollers 154 and 155 fluctuates so that the record timings of the recording heads 66 to 63 shift slightly and position registration cannot be ensured. Particularly in the case of a color image, even if a slight color shift occurs, a color bleeding generates, thus posing a significant problem of considerably lowering the image quality.

SUMMARY OF THE INVENTION

It is an object of the present invention to eliminate the above-described disadvantages associated with the conventional techniques, and provide a recording apparatus capable of recording an image of good quality by controlling the record timings in accordance with the feed speed of a recording medium.

It is another object of the present invention to provide a recording apparatus capable of controlling the record timings of a plurality of record means for each line during one page recording.

It is a further object of the present invention to provide a recording apparatus capable of cancelling the write timing shifts caused by a feed speed variation of a recording medium and always ensuring the registration of the write timings, by adjusting the write timings of the respective recording means while monitoring the feed speed of the feed means which feeds the recording medium.

It is a still further object of the present invention to provide a recording apparatus capable of correcting a relative position shift between respective recording means by directly detecting the feed speed of a recording medium.

It is another object of the present invention to provide a recording apparatus capable of correcting a feed speed variation of a recording medium and also an error in detecting a feed speed.

In order to achieve the above objects, the recording apparatus of this invention comprises a speed detecting roller for detecting the feed speed status of feed means, and timing adjusting means for adjusting an image record timing of each of recording means in accordance with the feed speed of the feed means detected by using the speed detecting roller.

In addition, the distance between image record start positions of the recording means is made equal to the outer peripheral length of the speed detecting roller.

The other objects of this invention other than those described above will become apparent from the following detailed description when read in conjunction with the accompanying drawings.

DETAILED DESCRIPTION OF THE PREFERRED EMBODIMENTS (First Embodiment)

Figure 1:
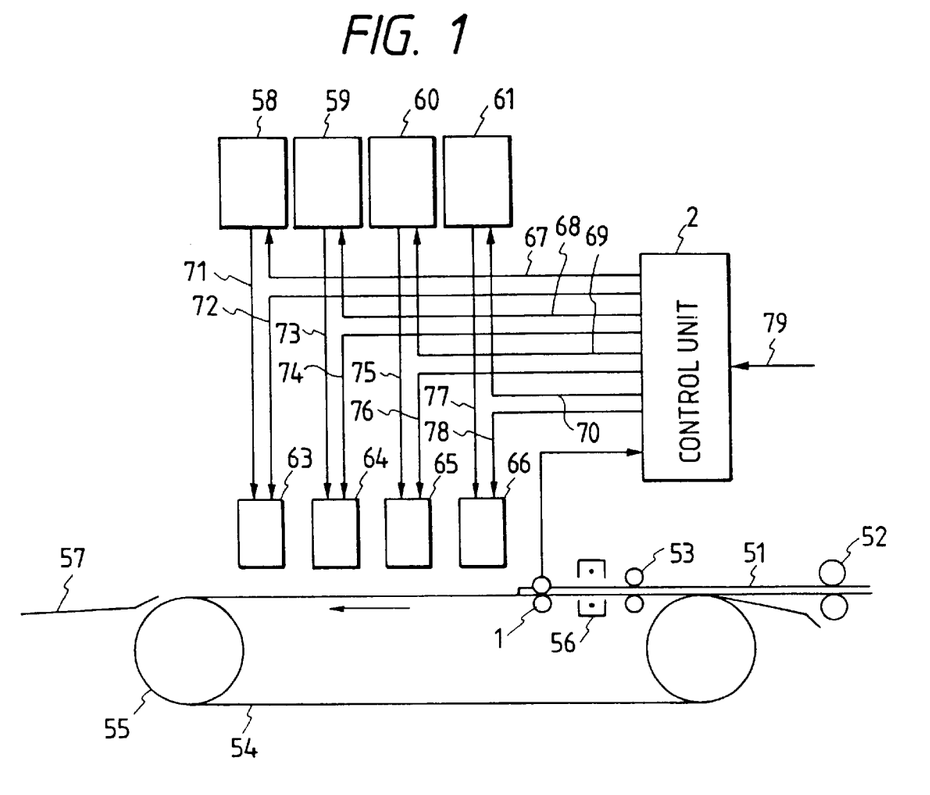
FIG. 1 is a block diagram showing a first embodiment of the recording apparatus according to this invention.

FIG. 1 is a block diagram showing the main part of the first embodiment of the recording apparatus for ensuring position registration according to the present invention. In FIG. 1, similar elements to those shown in FIG. 12 are represented by using identical reference numerals.

In FIG. 1, a speed detector 1 is constructed of, e.g., a pickup roller and rotary encoder. A pulse from the rotary encoder is monitored such that a control unit 2 recognizes the speed status in accordance with the monitored phase. The speed detector 1 may be an optical sensor an example of which is disclosed as a laser Doppler type sensor in Japanese Unexamined Patent Publication (Kokai) No. 61-130887. The speed detector 1 is mounted at the side end portion of a feed belt 54 so as not to obstruct the feeding of a cut sheet 51.

The control unit 2 serves also as timing adjusting means of this invention. The control unit 2 operates as in the following. When the speed detector 1 detects the feed speed status of the feed belt 54 serving as feed means, the control unit 2 checks the feed speed status of the feed belt 54 in accordance with the output from the speed detector 1. For example, if the feed speed becomes in excess of the normal reference feed speed V0, the image record timings of recording heads 66 to 63 are advanced, whereas if the feed speed becomes lower than the normal reference feed speed V0, the image record timings of the recording heads 66 to 63 are lagged. In this manner, the speed variation of the feed belt 54 is cancelled, and an image is recorded on the cut sheet 51 substantially at the normal image record timings, to thereby ensure registration between respective color images.

Figure 2:
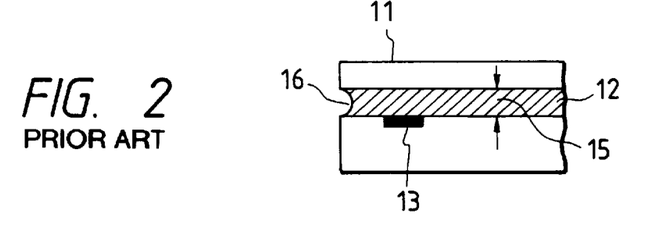
FIGS. 2 and 3 are a cross sectional view of the recording head shown in FIG. 1, and a cross sectional view used for explaining the ink jet principle.
Figure 3:
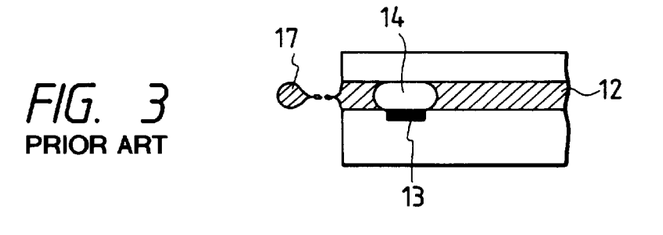

FIGS. 2 and 3 are a cross sectional view of one of the recording heads 66 to 63 shown in FIG. 1, and a cross sectional view used for explaining the ink jet principle. In FIGS. 2 and 3, a bubble jet type recording head is shown by way of example.

In FIGS. 2 and 3, recording ink 12 in a head main body 11 is heated in accordance with the electric energy supplied to a heat generating member 13. Reference numeral 14 represents a bubble, and 15 an ink jet passage.

When the recording ink 12 is supplied with heat corresponding to the electric energy inputted to the heat generating member 13, a bubble 14 generates within the jet passage 15. This bubble 14 causes an ink droplet 17 to be ejected out from a jet outlet 16 onto the surface of a recording medium.

In this embodiment, the head main bodies 11 are disposed in the main scan direction to form a full line covering the A4 shorter side. The head main bodies 11 are provided as many as to suffice a print resolution of 400 DPI, for example, so that 3,360 dots can be printed in the main scan direction.

Next, referring to FIGS. 4 and 5, the operation of adjusting the record start timings of the recording heads 63 to 66 shown in FIG. 1 will be described.

Figure 4:
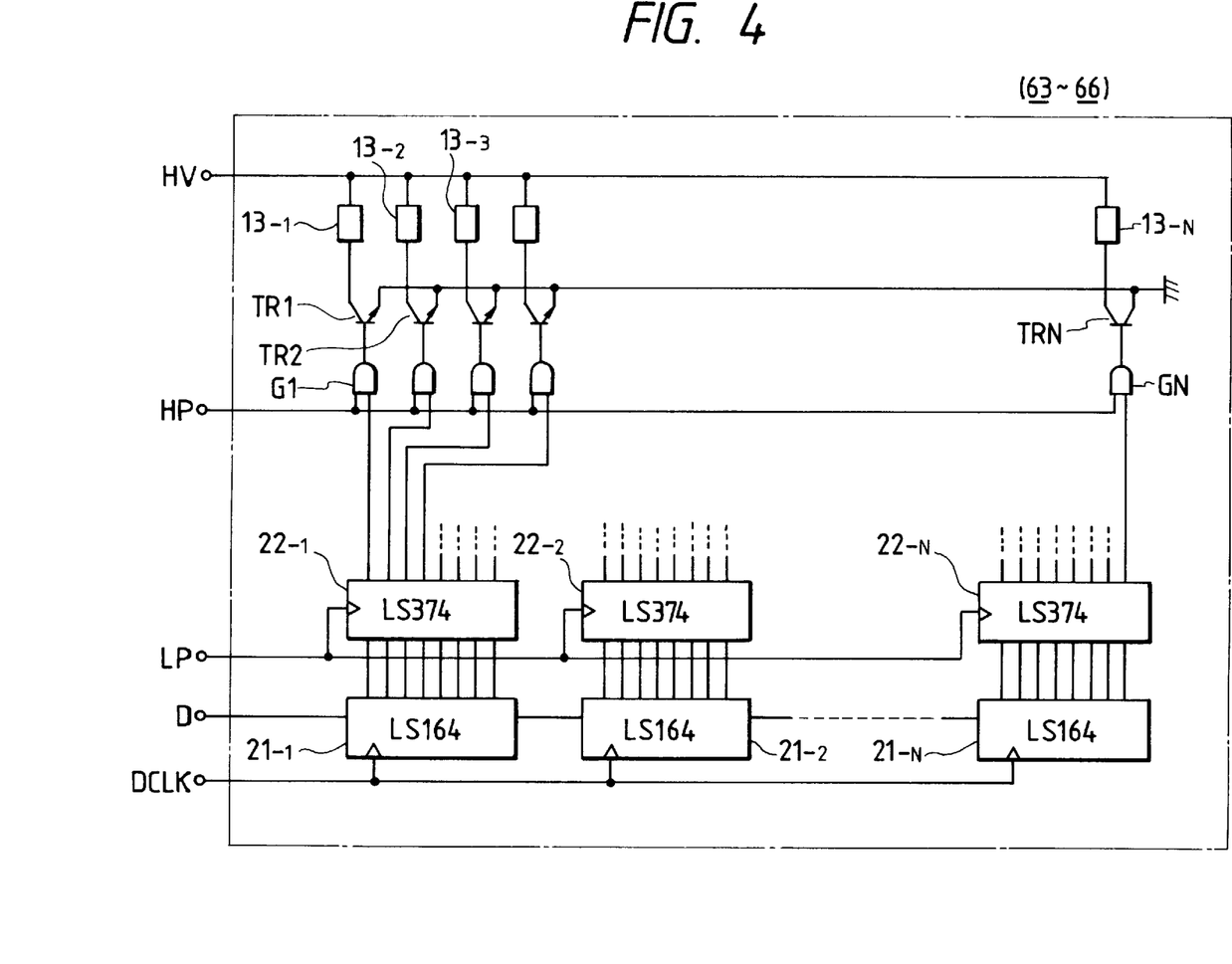
FIG. 4 is a circuit diagram showing a drive circuit for a bubble jet recording head made of the head main body shown in FIG. 2.

FIG. 4 is a circuit diagram of a drive circuit for a bubble jet recording head made of the head main body 11 shown in FIG. 2. Heat generating members 13-1 to 13-N, totaling 3,360 are each connected at their one end to a heater power source HV, and at their other end to the collectors of switching transistors TR1 to TRN. The bases of the switching transistors TR1 to TRN are supplied with outputs from AND gates G1 to GN. Each AND gate takes an AND between a heat pulse H and a latch output from each of latch circuits 22-1 to 22-N. An output of each AND gate turns on and off each switching transistor TR1 to TRN.

Shift registers 21-1 to 21-N sequentially shift, in synchro with data clocks DCLK, the data D corresponding to one line, i.e., 3,360 dots, stored in each image buffer 58 to 61. Latch circuits 22-1 to 22-N latch the data D transferred to the shift registers 21-1 to 21-N in synchro with latch pulses LP.

Figure 5:
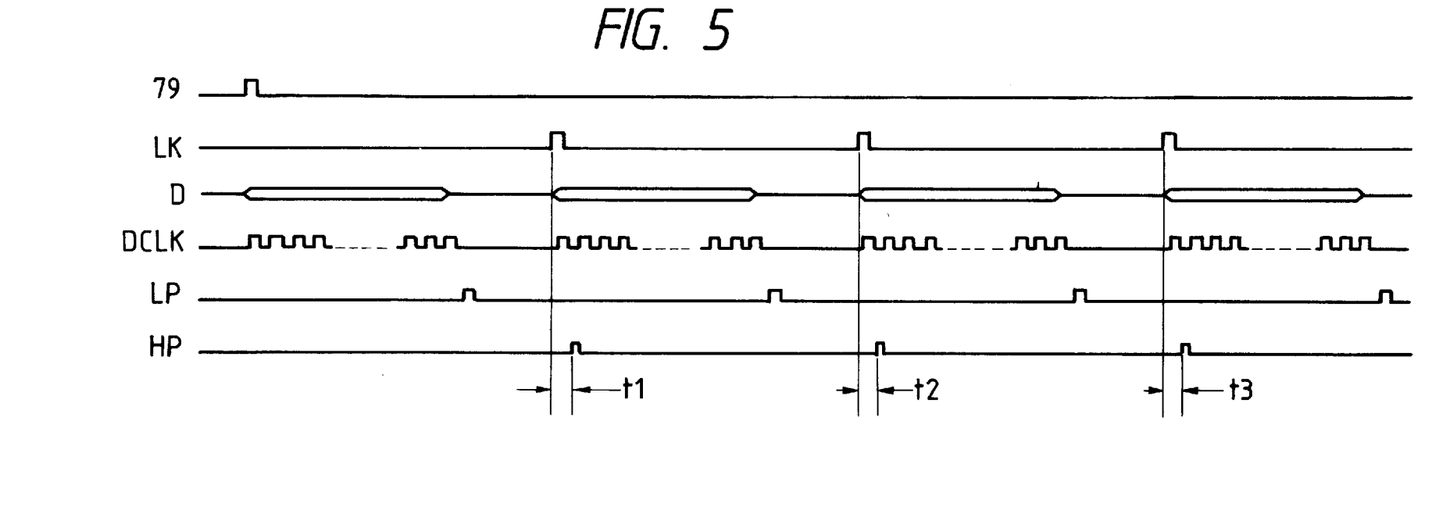
FIG. 5 is a timing chart used for explaining the operation of the drive circuit shown in FIG. 4.

FIG. 5 is a timing chart illustrating the operation of the circuit shown in FIG. 4. Signals identical to those shown in FIG. 4 are represented by identical reference characters in FIG. 5.

The data D is read from the image buffer 61 in response to the start signal 79 generated from the control unit 2 via the memory control line 70. The data D are then inputted via the data line 77 to the shift registers (e.g., LS164) 21-a to 21-N provided in the recording head 66 to sequentially shift the data D for each scan line, e.g., 3,360 dots. After transferring one line scan data D, a latch pulse LP is supplied from the control unit 2 via the record control line 78. The data are latched by the latch circuits (e.g., LS374) 22-1 to 22-N provided in the recording head 66.

The control unit 2 supplies a heat pulse HP to the recording head 66 via the record control line 78, at the time that the heat pulse HP is outputted so as to cancel the speed variation at each scan line, relative to a line clock generated by an internal counter. In this embodiment, heat pulses HP are outputted after the lapse of adjustment times t1, t2 and t3 after the corresponding line clocks LK rise, as shown in FIG. 5.

The AND gates G1 to GN in the recording head 66 are opened by the heat pulse HP so that the next stage switching transistors TR1 to TRN are turned on and off to selectively power the heat generating members 13-1 to 13-N for printing dots.

Next, the operation of adjusting the output timings of heat pulses HP shown in FIG. 5 will be described with reference to FIG. 6.

Figure 6:
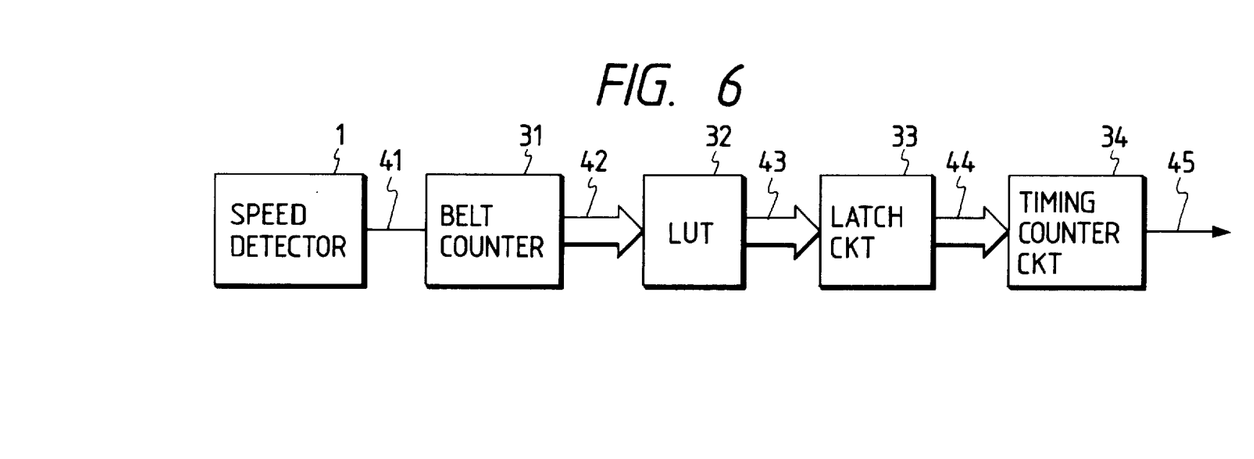
FIG. 6 is a block diagram of the heat pulse generation circuit for cancelling the feed speed variation according to the first embodiment.

FIG. 6 is a block diagram showing an example of a generation circuit for generating the heat pulse HP for cancelling a feed speed variation. The structure and operation thereof will be given in the following.

In FIG. 6, a belt counter 31 counts an encoder pulse 41 outputted from the encoder constituting the speed detector 1. Count data 42 are supplied to a look-up table (LUT) 32 constructed of, e.g., a ROM.

Assuming that the length of the feed belt 54 is about 700 mm, then data of 14 bits are required for position detection at a precision of 400 DPI.

The look-up table (LUT) 32 outputs speed change amount data 43 of the feed belt 54 corresponding to the count data 42, to a latch circuit 33. The speed change data 44 latched at the latch circuit 33 are supplied to a timing counter 34 which in turn outputs adjustment time data 45. The adjustment time data 45 determine the adjustment times t1 to t3 for determining the rise times of heat pulses HP after the rise of the line clocks LK.

The contents of the look-up table (LUT) 32 stored beforehand in a ROM, may be read at a predetermined time interval (e.g., before printing, after printing many sheets, or the like) and written in a RAM provided at the control unit 2.

In the above manner, it is possible to control the record timings of the recording head at each scan line in accordance with the speed change of the feed belt, to thereby enable a reproduction of a color image of good quality without color shift.

As described so far, according to the first embodiment, the recording apparatus comprises speed detecting means for detecting the feed speed status of feed means, and timing adjustment means for adjusting the image record timings of each recording means in accordance with the feed speed status of the feed means detected by the speed detecting means. It is therefore possible to adjust the record start timings in the sub-scan direction in accordance with the speed change amount of the feed means for feeding a recording medium, so that the image record start position for each recording means can be controlled always at proper timings while cancelling the speed variation caused by the feed means. As a result, registration of the images for respective colors is always retained at high precision, to thus output a clear color image of high quality.

(Second Embodiment)

In the first embodiment, record timings are adjusted by detecting the speed of the feed belt 54. In the second embodiment, a roll sheet is used as a recording medium, and recording timings are adjusted by detecting the feed speed of the roll sheet itself.

According to the second embodiment, since the feed speed of a roll sheet itself is detected, it is possible to avoid incorrect detection of the feed speed to be caused by a slippage of a roll sheet on the feed belt.

In the following the second embodiment will be described in detail.

Figure 7:
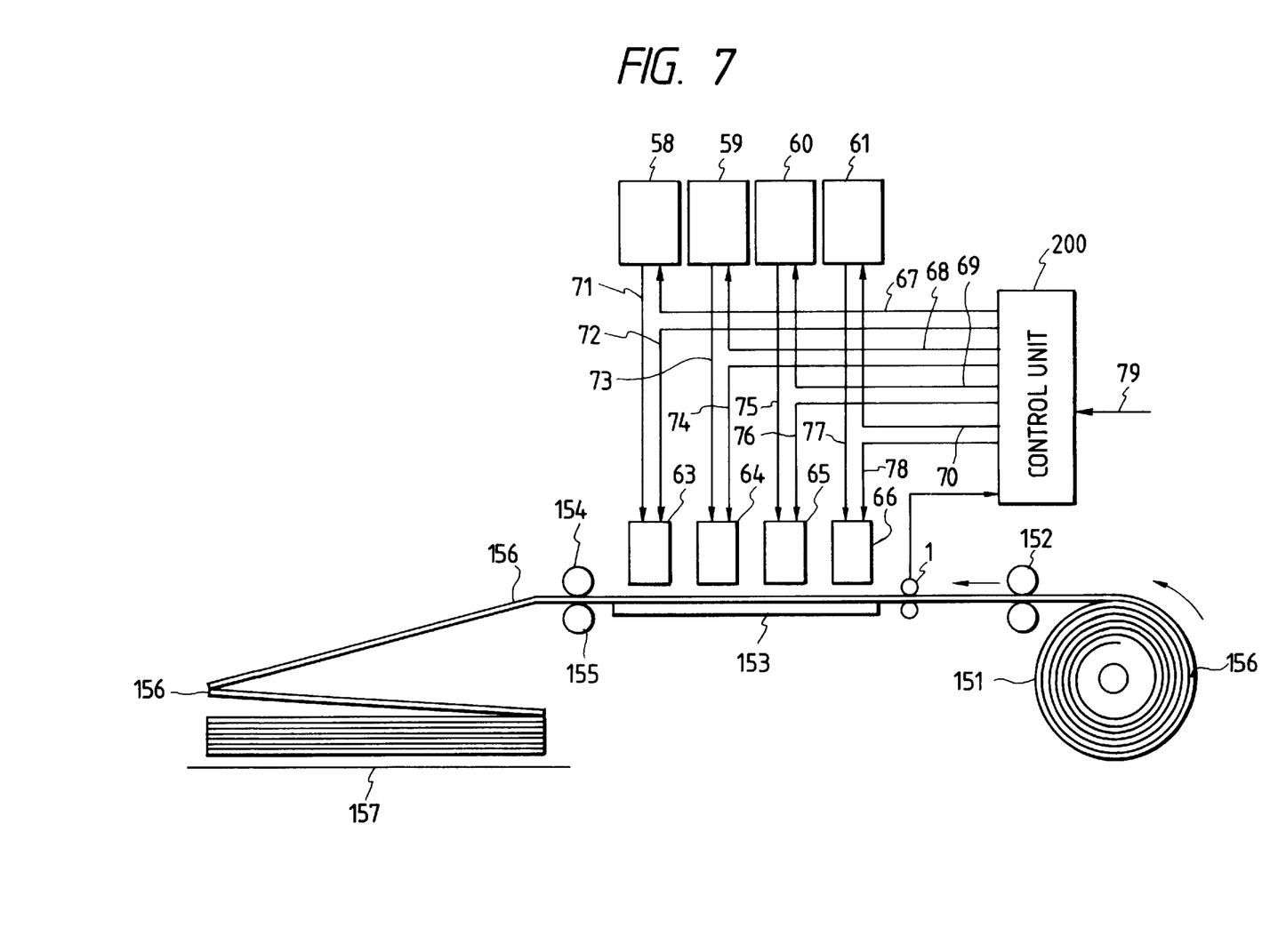
FIG. 7 is a block diagram showing a second embodiment of the recording apparatus according to the present invention.

FIG. 7 is a block diagram showing the main part of the second embodiment of the recording apparatus for ensuring position registration according to the present invention. In FIG. 7, similar elements to those shown in FIG. 14 and 1 are represented by using identical reference numerals.

In FIG. 7, a speed detector 1 is constructed of, e.g., a pickup roller and rotary encoder. A pulse from the rotary encoder is outputted to a control unit 200. The speed detector 1 may be an optical sensor of a laser Doppler type. The speed detector 1 is mounted near a feed belt 66.

The speed detector 1 detects the feed speed status of a roll sheet 151 or recording medium and outputs the speed information to the control unit 200 which serves also as timing adjusting means. The control unit 200 obtains a difference between reference feed speed clocks and actual feed speed clocks by means of a count mechanism to be described later. For example, if the feed speed becomes in excess of the normal reference feed speed V0, the image record timings of recording heads 66 to 63 are advanced, whereas if the feed speed becomes lower than the normal reference feed speed V0, the image record timings of the recording heads 66 to 63 are lagged. In this manner, the speed variation of the roll sheet (recording medium) 151 is cancelled, and an image is recorded on the roll sheet 151 substantially at the normal image record timings, to thereby ensure registration between respective color images. The cross sectional view of the recording head 66 to 63 and the cross sectional view used for explaining the ink jet principle, are the same as those shown in FIGS. 2 and 3, so the drawings are not shown in duplicate.

The record start timings of the recording heads 63 to 66 shown in FIG. 7 are the same as those shown in FIGS. 4 and 5, so the description therefor is omitted.

Figure 8:
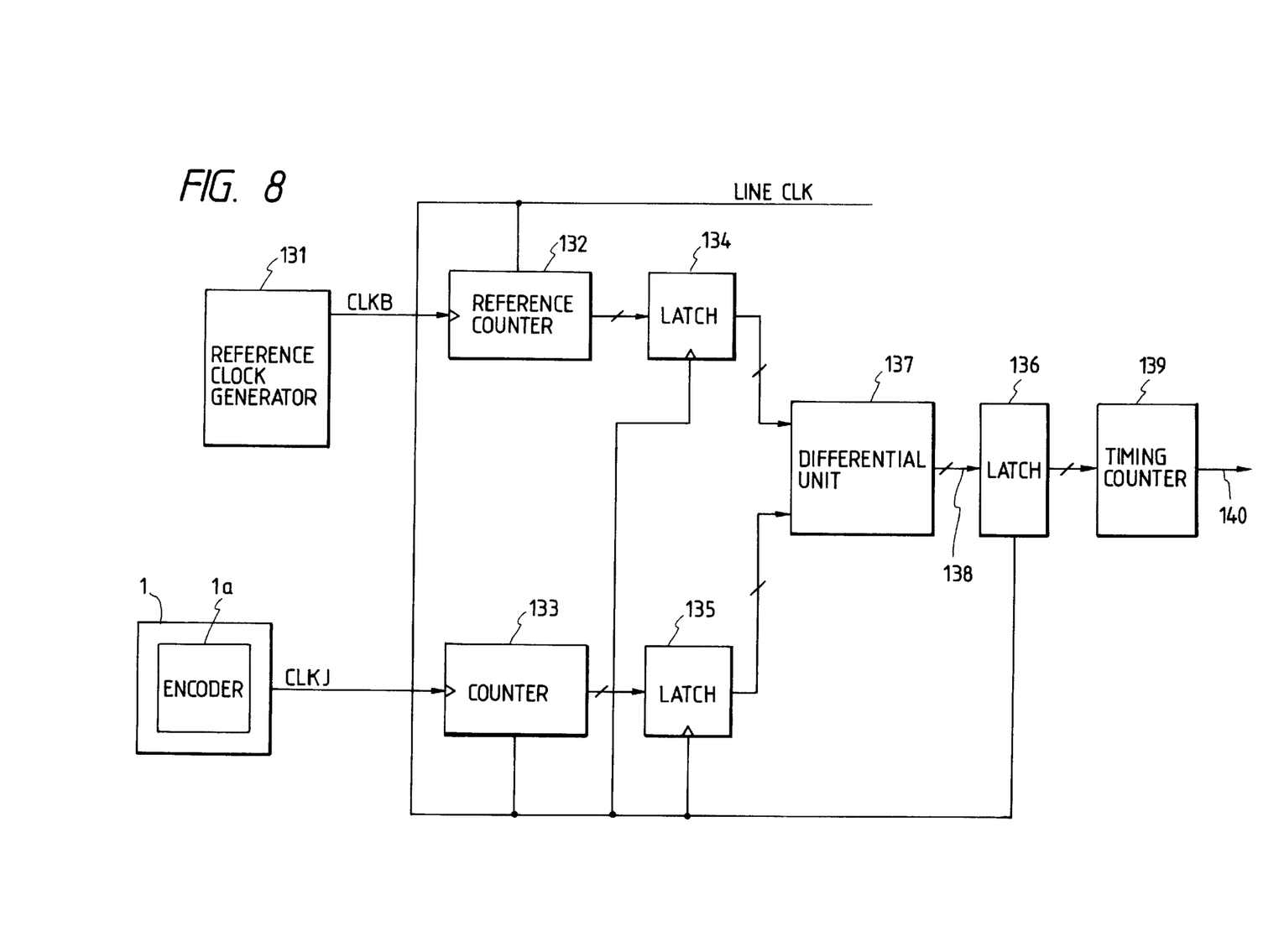
FIG. 8 is a block diagram of the heat pulse generation circuit for cancelling the feed speed variation according to the second embodiment.

Next, referring to FIG. 8 showing the detail of the control unit 200, the operation of adjusting the output timings of the heat pulses shown in FIG. 5 will be described.

FIG. 8 is a block diagram showing an example of a generation circuit for generating the heat pulse HP for cancelling a feed speed variation of a roll sheet. A reference clock generator 131 generates reference clocks CLKB and supplies them to a reference counter 132. The reference counter counts the reference clocks CLKB in synchro with a line clock CLK. A latch 134 latches the count value in synchro with the next line clock CLK.

An actual counter 133 counts actual clocks CLKJ outputted from an encoder 1a of the speed detector 1, and the count is latched by a latch 135.

A differential unit 137 calculates a difference between the count values latched at the latches 134 and 135. The difference value 138 is latched by a latch 136. A timing counter 139 outputs a timing signal 140 by which the timings between the line clock CLK and heat pulse HP are controlled in accordance with the difference value 138. By using the timing signal 140, the adjustment times t1, t2, and t3 shown in FIG. 5 are determined so that the heat pulses HP rise at the timings which allow to cancel the feed speed variation of the recording medium.

As described above, according to the second embodiment, the recording apparatus comprises speed detecting means for directly detecting the feed speed of a recording medium (cut sheet), and timing adjustment means for adjusting the image record timings of each recording means for each line in accordance with the feed speed status of the recording medium detected by the speed detecting means. It is therefore possible to adjust the record start timings in the sub-scan direction in accordance with the speed change amount of the recording medium, so that the image record start position for each recording means can be controlled always at proper timings while cancelling the speed variation caused by the feed means.

The second embodiment directly detects the speed of the recording medium, in contrast with the first embodiment which detects the speed of the feed belt. Therefore, it is possible to avoid incorrect speed detection to be caused by slippage of the recording medium on the feed belt.

As a result, registration of the images for respective colors are always retained at high precision, to thus output a clear color image of high quality.

(Third Embodiment)

In the third embodiment, a recording apparatus will be described wherein image data for each color are recorded on a recording medium at the timings which allow to cancel the intrinsic detection error components of a speed detection roller by making the distance between image record start positions of recording means 63 to 66 equal to the outer peripheral length of the speed detection roller.

Figure 9:
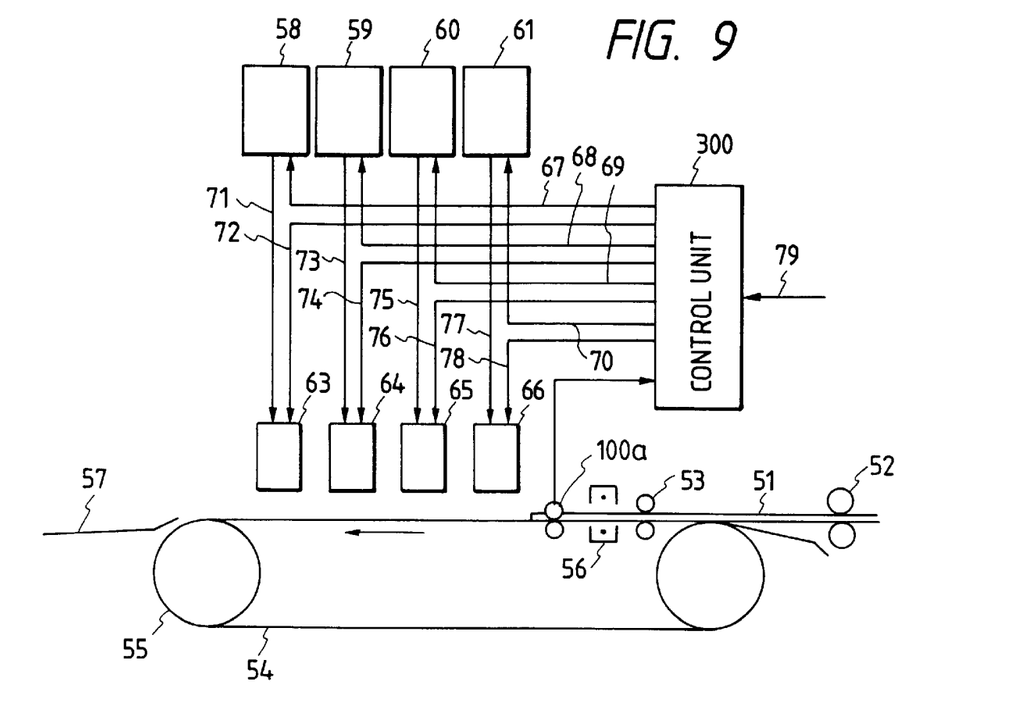
FIG. 9 is a block diagram showing a third embodiment of the recording apparatus according to the present invention.

FIG. 9 is a block diagram showing the main part of the third embodiment of the recording apparatus for ensuring position registration according to the present invention. In FIG. 9, similar elements to those shown in FIG. 1 and 12 are represented by using identical reference numerals.

In FIG. 9, a speed detector 100 is constructed of, e.g., a pickup roller 100a and rotary encoder. A pulse from the rotary encoder is monitored such that a control unit recognizes the speed state in accordance with the monitored phase. The speed detector 100 may be an optical sensor. The speed detector 100 is mounted at the side end portion of a feed belt 54 so as not to obstruct the feeding of a cut sheet 51.

The control unit 300 serves also as timing adjusting means of this invention. The control unit 200 operates as in the following. When the speed detector 100 detects the feed speed status of the feed belt 54, the control unit 300 checks the feed speed status of the feed belt 54 in accordance with the output from the speed detector 100. For example, if the feed speed becomes in excess of the normal reference feed speed V0, the image record timings of recording heads 66 to 63 are advanced while taking a detection error of the pickup roller 100a into consideration in the manner to be described later, whereas if the feed speed becomes lower than the normal reference feed speed V0, the image record timings of the recording heads 66 to 63 are lagged while considering a detection error of the pickup roller 100a into consideration. In this manner, the speed variation of the feed belt 54 is cancelled, and an image is recorded on the cut sheet 51 substantially at the normal image record timings, to thereby ensure registration between respective color images. Specifically, the pickup roller 100a of the speed detection roller detects the feed speed of the feed belt 54 serving as the feed means, and informs the control unit 300 constituting the timing adjusting means of a higher or lower feed speed of the feed belt 54. The control unit 30 then corrects the detected feed speed while considering the intrinsic detection error of the speed detection roller, and adjusts the image record timings of the recording heads 66 to 63, to thereby record image data for each color on the cut sheet 51 at the timings cancelling the speed variation of the feed belt 54.

The distance between image record start positions of the recording heads is made equal to the outer peripheral length of the pickup roller 100a, so that the image data for each color can be recorded on the cut sheet 51 at the timings cancelling the intrinsic detection error of the pickup roller 100a.

The cross sectional view of the recording heads 66 to 63 and the cross sectional view used for explaining the ink jet principle, are the same as shown in FIGS. 2 and 3.

In FIGS. 2 and 3, recording ink 12 in a head main body 11 is heated in accordance with the electric energy supplied to a heat generating member 13. Reference numeral 14 represents a bubble.

When the recording ink 12 is supplied with heat corresponding to the electric energy inputted to the heat generating member 13, a bubble 14 generates within the jet passage 15. Thus bubble 14 causes an ink droplet 17 to be ejected out from a jet outlet 16 onto the surface of a recording medium.

In this embodiment, the head main bodies 11 are disposed in the main scan direction to form a full line covering the A4 shorter side. The head main bodies 11 are provided as many as to suffice a print resolution of 400 DPI, for example, so that 3,360 dots can be printed in the main scan direction.

The operation of adjusting the record start timings of the recording heads 63 to 66 is the same as described with FIGS. 4 and 5, so the description therefor is omitted.

Figure 10:
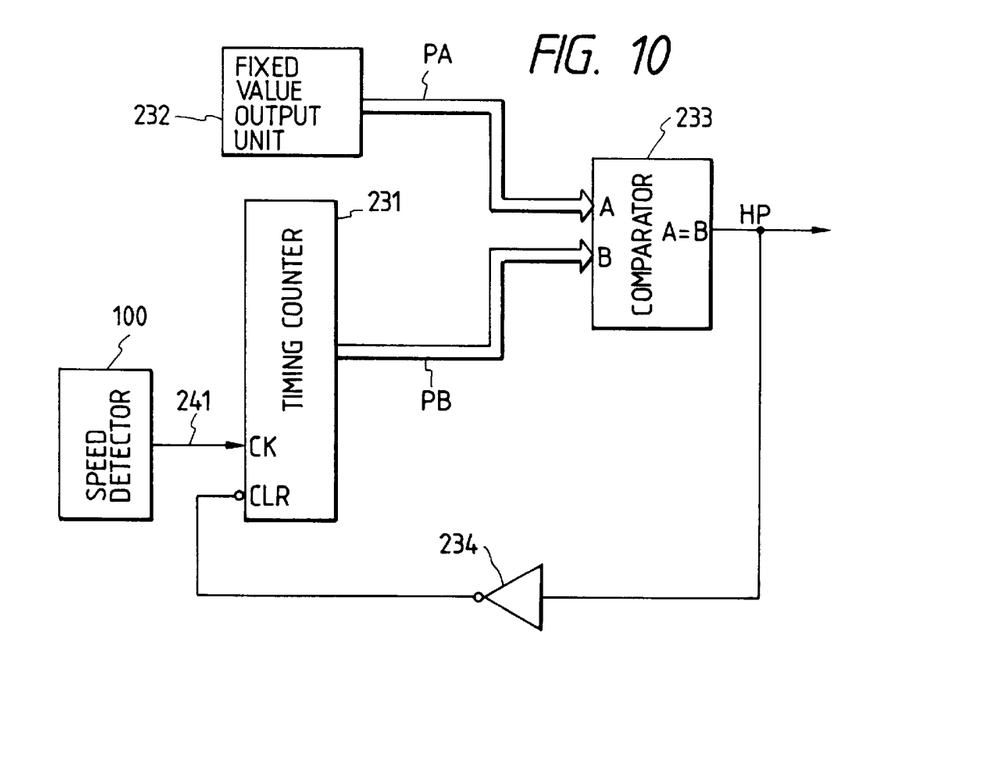
FIG. 10 is a block diagram used for explaining the output timing of a heat pulse according to the third embodiment.

FIG. 10 is a block diagram illustrating the operation of a circuit for generating the heat pulse HP shown in FIG. 5 for the third embodiment.

In FIG. 10, a timing counter 231 counts the pulses for each line outputted from the speed detector 100.

A fixed value output unit 232 outputs to an input port A of a comparator 233 the number PA (fixed value) of pulses per one line, the fixed value being set on the assumption that there is no eccentricity with the pickup roller 100a. When the number PA of pulses inputted to the input port A becomes equal to a count value PB supplied from the timing counter 231, the comparator 233 outputs a heat pulse HP which clears the contents of the timing counter 231.

Figure 11:
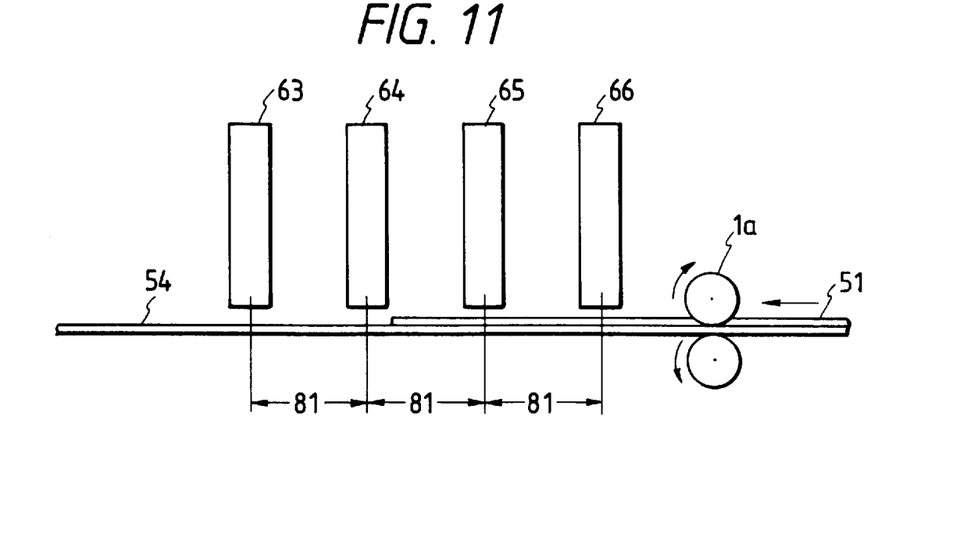
FIG. 11 is a cross section used for explaining the positional relation of recording heads shown in FIG. 9.

Even if the pickup roller 100a is eccentric and the detected speed has an error, the heat pulse HP can be outputted at the timing cancelling such an error. In addition, as shown in FIG. 11, since the distance 81 between record start positions of the recording heads 66 to 63 is made equal to the outer peripheral length of the pickup roller 100a, the cut sheet 51 is fed correctly to the next record start position upon one rotation of the pickup roller 100a, with the heat pulse HP being applied to the recording heads 63 to 66 at the corrected timings.

As described so far, according to the third embodiment, the recording apparatus comprises a speed detection roller for detecting the feed speed status of feed means, and timing adjustment means for adjusting the image record timings of each recording means in accordance with the feed speed of the feed means detected by the speed detection roller. It is therefore possible to adjust the record start timings in the sub-scan direction in accordance with the speed change amount of the feed means for feeding a recording medium, and to record image data by the recording means at the timings cancelling the intrinsic detection error of the speed detection roller.

Further, since the distance between image record start positions of the recording means is made equal to the outer peripheral length of the speed pickup roller, image recording by the recording means can be performed at proper timings. As a result, registration of the images for respective colors are always retained at high precision, to thus output a clear color image of high quality.

The third embodiment uses a cut sheet and detects the feed speed of the feed belt. The third embodiment may also use a roll sheet as in the second embodiment.

In the first to third embodiments, a bubble jet printer is used for embodying the present invention. Other printers such as a printer having a plurality of full-line thermal heads or electrophotographic drums may be used.

Also in the above embodiments, recording one line after another with recording heads has been described. Recording plural lines at a time with recording heads may also be applied.

In the first to third embodiments, a cut sheet 51 as a recording medium is electrostatically attracted toward the feed belt 54. The invention is also applicable to the feed means which winds a recording medium about a drum with a grip.

Further in the first to third embodiments, 3,360 dots are driven at a time as described with FIG. 4. The 3,360 dots may be divided in some units, e.g., in units of 64 dots, and these units may be driven independently according to the capacity of the power supply.

Furthermore, in the first to third embodiments, a color image is recorded by using a plurality of recording heads while controlling the record timings of the recording heads. The invention is also applicable to a monochrome image by controlling the record timings of recording heads for each line.

The present invention has been described with reference to the preferred embodiments. The invention is not limited to the above-described embodiments only, but various modifications are possible which fall within the scope of the appended claims.

We claim:

1. A recording apparatus which uses a recording means for recording an image on a recording medium in accordance with an image data supplied from an image data source, the recording apparatus comprising:

movement means for moving the recording medium, the movement means having a recording medium feeding unit having at least a one outer peripheral portion, the recording medium being moved according to a positional change of said recording medium feeding unit of said movement means;

detection means for detecting a state of a movement speed of said at least one outer peripheral portion of said movement means;

table means, which comprises memory means previously storing correction data according to a periodic change of the movement speed in an operation of said movement means, for outputting corresponding correction data in accordance with the state of the movement speed detected by said detection means, from said memory means, the table means having an output;

providing means for providing a driving signal to the recording means in accordance with the image data from the image data source; and control means for controlling the providing means providing the driving signal to the recording means at an image record timing in accordance with the output of said table means.

2. An apparatus according to claim 1, wherein said detection means comprises;

generating means for generating a pulse signal in accordance with an operation of said movement means, and counting means for counting the pulse signal and for outputting a count signal according to a count value.

3. An apparatus according to claim 1, wherein said movement means comprises a feed means feeding the recording medium in a sub-scan direction relative to said recording means.

4. An apparatus according to claim 3, wherein said feed means includes a feed belt for feeding the recording medium.

5. An apparatus according to claim 1, wherein said recording means comprises a plurality of recording elements corresponding to a single line of image data disposed along a width of the recording medium in a main-scan direction relative to said recording means.

6. An apparatus according to claim 5, wherein said recording means records the image by ejecting an ink droplet.

7. An apparatus according to claim 6, wherein said recording means records the image by ejecting said ink droplet using thermal energy.

8. An apparatus according to claim 1, wherein said recording means records the image by ejecting an ink droplet.

* * * * *

UNITED STATES PATENT AND TRADEMARK OFFICE
CERTIFICATE OF CORRECTION

PATENT NO. : 5,828,387           Page 1 of 2
DATED : October 27, 1998
INVENTOR(S) : MASAFUMI WATAYA, ET AL.

It is certified that error appears in the above-identified patent and that said Letters Patent is hereby corrected as shown below:

COLUMN 1

Line 39, "apparatus" should read --an apparatus--.
    Line 45, "synchro" should read --synchronism--.

COLUMN 2

Line 12, "synchro" should read --synchronism--.
    Line 23, "pre ceding" should read --preceding--.
    Line 26, "t he" should read --the--.

COLUMN 5

Line 13, "sensor" should read --sensor,--.

COLUMN 6

Line 5, "synchro" should read --synchronism--.

COLUMN 7

Line 65, "synchro" should read --synchronism--.
    Line 67, "synchro" should read --synchronism--.

UNITED STATES PATENT AND TRADEMARK OFFICE
CERTIFICATE OF CORRECTION

PATENT NO. : 5,828,387
DATED : October 27, 1998
INVENTOR(S) : MASAFUMI WATAYA, ET AL.

It is certified that error appears in the above-identified patent and that said Letters Patent is hereby corrected as shown below:

<u>COLUMN 8</u>

Line 57, "unit 200" should read --unit 300--.

<u>COLUMN 9</u>

Line 1, "considering" should read --taking--.

Signed and Sealed this

Thirteenth Day of July, 1999

Q. TODD DICKINSON

*Attest:*

*Attesting Officer*  *Acting Commissioner of Patents and Trademarks*